(12) United States Patent
Yasuda et al.

(10) Patent No.: US 8,816,209 B2
(45) Date of Patent: Aug. 26, 2014

(54) SUBMERSIBLE MOTOR ELECTRIC WIRE

(75) Inventors: Shuhei Yasuda, Hitachi (JP); Kiyoshi Watanabe, Hitachi (JP); Hisao Furuichi, Hitachi (JP); Takanori Yamazaki, Mito (JP); Tatsuji Ishibashi, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 813 days.

(21) Appl. No.: 12/467,517

(22) Filed: May 18, 2009

(65) Prior Publication Data

US 2009/0283297 A1 Nov. 19, 2009

(30) Foreign Application Priority Data

May 16, 2008 (JP) ................................. 2008-129540

(51) Int. Cl.
 *H01B 7/17* (2006.01)
 *H01B 3/44* (2006.01)
 *H01B 3/46* (2006.01)
 *H01B 3/30* (2006.01)
(52) U.S. Cl.
 CPC .................. *H01B 3/441* (2013.01); *H01B 3/46* (2013.01); *H01B 3/30* (2013.01)
 USPC .................................................... 174/120 R
(58) Field of Classification Search
 USPC ................................................... 174/120 R
 See application file for complete search history.

(56) References Cited

U.S. PATENT DOCUMENTS

| 4,058,583 | A  | * | 11/1977 | Glander et al. ........... 264/171.19 |
| 4,921,916 | A  | * | 5/1990 | Howell et al. .................. 525/423 |
| 6,468,583 | B1 | * | 10/2002 | Jackson et al. ................ 427/117 |
| 6,703,435 | B2 | * | 3/2004 | Barioz ........................... 524/269 |
| 6,811,875 | B2 | * | 11/2004 | Kikuchi et al. ................ 428/372 |
| 6,906,257 | B2 | * | 6/2005 | Saccomanno et al. .......... 174/36 |
| 7,714,231 | B2 | * | 5/2010 | Varkey et al. ............. 174/120 R |
| 2004/0024138 | A1 | * | 2/2004 | Allermann ..................... 525/342 |
| 2006/0173123 | A1 | * | 8/2006 | Yang et al. ..................... 524/543 |
| 2007/0221395 | A1 | * | 9/2007 | Hase et al. .............. 174/120 SR |
| 2010/0209705 | A1 | * | 8/2010 | Lin et al. ....................... 428/391 |

FOREIGN PATENT DOCUMENTS

| JP | 61-114410 | 6/1986 |
| JP | 04-087222 | 3/1992 |
| JP | 05-325653 | 12/1993 |

* cited by examiner

*Primary Examiner* — Chau N Nguyen
(74) *Attorney, Agent, or Firm* — Scully, Scott, Murphy & Presser, P.C.

(57) ABSTRACT

A submersible motor electric wire includes a conductor including a copper wire and an enamel coating formed on the periphery of the copper wire, and an insulating sheath layer formed outside the conductor. The insulating sheath layer includes a silane graft polymer as a main constituent. The silane graft polymer is formed by a graft-polymerization that an unsaturated silane compound and an organic peroxide are added to polyethylene, and is cross-linked contacting with water in the presence of a siloxane condensation catalyst. Alternatively, the insulating sheath layer includes a composition including polyethylene as a main constituent, and the composition is cross-linked by being irradiated with an ionizing radiation.

22 Claims, 2 Drawing Sheets

11 SUBMERSIBLE MOTOR ELECTRIC WIRE
12 COPPER WIRE
13 ENAMEL COATING
14 CONDUCTOR
15 INSULATING SHEATH LAYER

21 SUBMERSIBLE MOTOR ELECTRIC WIRE
22 COPPER WIRE
23 ENAMEL COATING
24 CONDUCTOR
25 INSULATING SHEATH LAYER

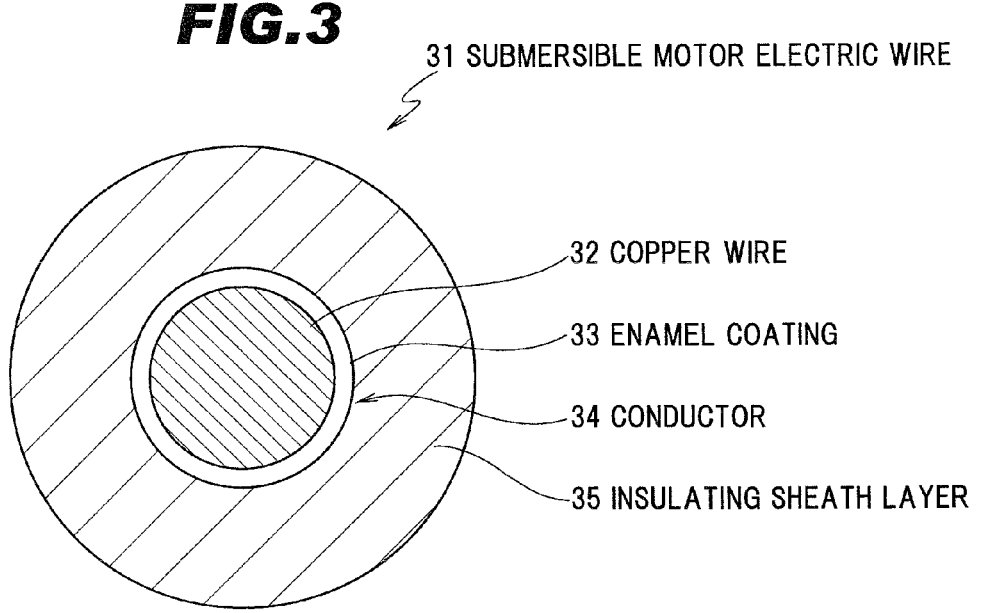

SUBMERSIBLE MOTOR ELECTRIC WIRE

The present application is based on Japanese patent application No. 2008-129540 filed May 16, 2008, the entire contents of which are incorporated herein by reference.

BACKGROUND OF THE INVENTION

1. Field of the Invention

This invention relates to a submersible motor electric wire (i.e., an electric wire for a submersible motor) capable of having a good water-treeing resistance for a long term and, in particular, to a submersible motor electric wire suitable for use under a radiation environment.

2. Description of the Related Art

A submersible motor electric wire is used for a coil (a winding wire) or the like of a submersible motor. The submersible motor electric wire is provided for the purpose of being used in water, as indicated by the name, so that it has an insulating sheath layer for covering a conductor. When the winding wire is immersed in water, it becomes in a state of containing excessive water between the molecules of the insulating sheath layer with the immersion time. If the insulating sheath layer containing water directly contacts with the conductor (for example, copper), copper ions deposit and diffuse into the insulating sheath layer from the surface of the conductor toward the periphery of the winding wire due to that voltage is applied at the operation of the submersible motor. Further, due to the copper ions, a water-treeing occurs in the insulating sheath layer, and the water-treeing causes an insulation deterioration or an insulation breakdown of the winding wire.

Therefore, conventionally, the submersible motor electric wire is configured to have a conductor shielding insulating layer (for example, an enamel layer made of an enamel resin) formed on the periphery of the conductor as a film for preventing the deposition and diffusion of the copper ions (for example, refer to JP-A-05-325653).

On the other hand, cross-linked polyethylene can be used as a material of the insulating sheath layer of the submersible motor electric wire in order to improve heat resistance.

The cross-linked polyethylene is obtained by conducting cross-linking between the molecules of polyethylene so as to form a reticular molecule structure, and various methods have been used as the cross-linking method, but in case of thermal chemistry cross-linking method it is preferable to carry out the cross-linking by adding an organic peroxide as a cross-linking agent such as dicumyl peroxide (as expressed by chemical formula (A)) into polyethylene and conducting heat treatment so as to initiate a reaction.

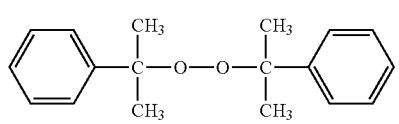

(A)

As a result, cross-linking cracked residues produced incident to the above-mentioned chemical reaction may exist in the cross-linked polyethylene corresponding to the insulating sheath layer after cross-linking. The cross-linking cracked residue may be, for example, cumyl alcohol (as expressed by chemical formula (B)), acetophenone (as expressed by chemical formula (C)), and α-methylstyrene (as expressed by chemical formula (D)).

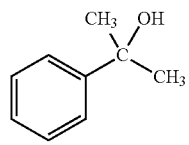

(B)

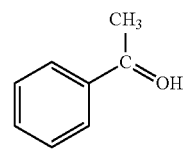

(C)

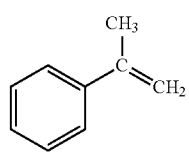

(D)

The above related arts are disclosed in, e.g., JP-A-61-114410 and JP-A-04-87222.

Further, at present day, there is a tendency that the submersible motor electric wire is needed to be increased in longevity, so that it is needed to further enhance the water-treeing resistance. "To enhance the water-treeing resistance", which may be also expressed "to enhance a water-treeing property", means "to prevent the occurrence of water-treeing".

As mentioned above, if the submersible motor electric wire is immersed in water in a state that the insulating sheath layer made of the cross-linked polyethylene or the like directly contacts with the conductor, copper ions deposit and diffuse into the insulating sheath layer, and due to the copper ions, a water-treeing occurs and grows in the insulating sheath layer, so as to causes a short-time insulation breakdown of the winding wire. As a measure of this, the enamel layer is disposed between the conductor and the insulating sheath layer as the conductor shielding insulating layer.

However, the submersible motor electric wire configured to have a structure that the polyethylene of the insulating sheath layer is cross-linked by the thermal chemistry cross-linking method and the enamel is used as the conductor shielding insulating layer may affect the water-treeing resistance thereof, since if it is used for a long time, the enamel swells due to that the cross-linking cracked residue penetrates between the molecules of the enamel resin so that a crazing occurs in the enamel resin. This is due to that the cross-linking cracked residue has a benzene ring (a kind of aromatic ring) and has a low molecular weight so that it easily penetrates between the molecules of the enamel resin which has a benzene ring (a kind of aromatic ring) as well as the residue.

SUMMARY OF THE INVENTION

Therefore, it is an object of the invention to provide a submersible motor electric wire that is capable of keeping a good water-treeing resistance for a long term.

(1) According to one embodiment of the invention, a submersible motor electric wire comprises:

a conductor comprising a copper wire and an enamel coating formed on the periphery of the copper wire; and an insulating sheath layer formed outside the conductor, wherein the insulating sheath layer comprises a silane graft polymer as a main constituent, and the silane graft polymer is formed by a graft-polymerization that an unsaturated silane compound and an organic peroxide are added to polyethylene, and is cross-linked contacting with water in the presence of a siloxane condensation catalyst.

In the above embodiment (1), the following modifications and changes can be made.

(i) The organic peroxide is added in a proportion of not more than 0.15 part by mass to 100 parts by mass of the polyethylene.

(2) According to another embodiment of the invention, a submersible motor electric wire comprises:

a conductor comprising a copper wire and an enamel coating formed on the periphery of the copper wire; and an insulating sheath layer formed outside the conductor, wherein the insulating sheath layer comprises a composition including polyethylene as a main constituent, and the composition is cross-linked by being irradiated with an ionizing radiation.

In the above embodiment (1) or (2), the following modifications and changes can be made.

(ii) The insulating sheath layer further comprises an antioxidant including an aromatic ring, and the antioxidant is added in a proportion of not less than 0.1 part by mass to 100 parts by mass of the polyethylene.

Points of the Invention

According to the embodiment of the invention, the insulating sheath layer comprises a silane graft polymer as a main constituent, which is formed by a graft-polymerization that an unsaturated silane compound and an organic peroxide are added to polyethylene, and the silane graft polymer is cross-linked contacting with water in the presence of a siloxane condensation catalyst. Thus, the cross-linking can be sufficiently achieved by adding a smaller amount of the organic peroxide than that in the conventional chemical cross-linking method. Therefore, deterioration in the water-treeing resistance can be prevented which may be caused by the cross-linking cracked residue of the organic peroxide, so that the water-treeing resistance can be kept for a long term.

Alternatively, according to the other embodiment of the invention, the insulating sheath layer comprises a composition including polyethylene as a main constituent, and the composition is cross-linked by being irradiated with an ionizing radiation. Thus, the cross-linking can be sufficiently achieved without adding organic peroxide. Therefore, deterioration in the water-treeing resistance can be prevented which may be caused by the cross-linking cracked residue of the organic peroxide, so that the water-treeing resistance can be kept for a long term.

BRIEF DESCRIPTION OF THE DRAWINGS

The preferred embodiments according to the invention will be explained below referring to the drawings, wherein:

FIG. 3 is a transverse cross-sectional view schematically showing a conventional submersible motor electric wire.

DETAILED DESCRIPTION OF THE PREFERRED EMBODIMENTS

First Embodiment

Figure 1:
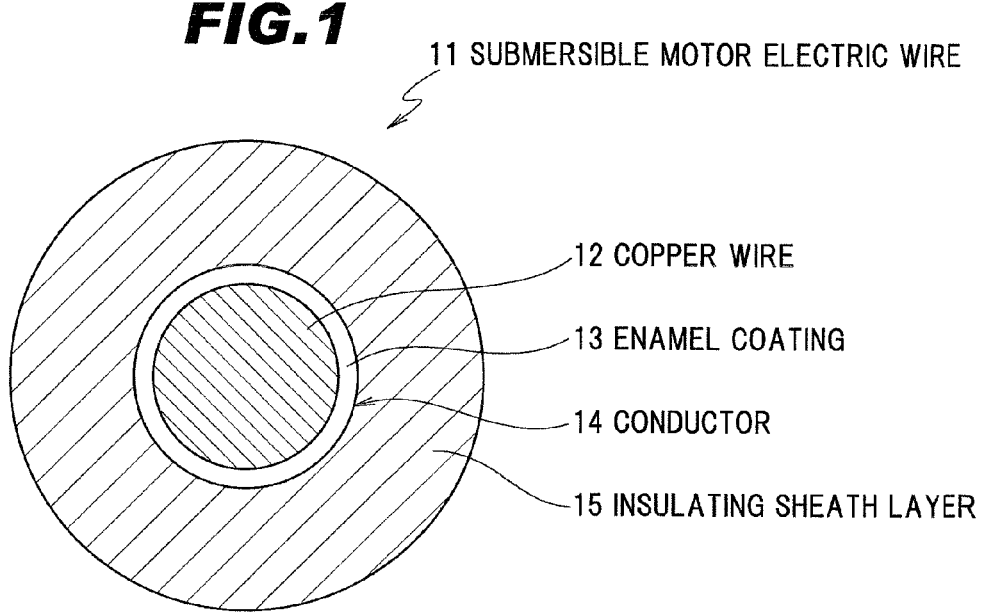
FIG. 1 is a transverse cross-sectional view schematically showing a submersible motor electric wire in a first embodiment according to the invention.

A submersible motor electric wire in the first embodiment according to the invention will be explained below referring to the drawings.

As shown in FIG. 1, a submersible motor electric wire 11 in a first embodiment according to the invention comprises a conductor 14 comprising a copper wire 12 and an enamel coating 13 formed on the periphery of the copper wire 12 and an insulating sheath layer 15 formed on the periphery of the conductor 14, wherein the insulating sheath layer 15 comprises a silane graft polymer as a main constituent, and the silane graft polymer is formed by a graft-polymerization that an unsaturated silane compound and an organic peroxide are added to polyethylene, and the silane graft polymer is cross-linked contacting with water in the presence of a siloxane condensation catalyst.

Due to this, the cross-linking can be sufficiently achieved by adding a smaller amount of the organic peroxide than that in the conventional chemical cross-linking method. Therefore, deterioration in the water-treeing resistance can be prevented which may be caused by the cross-linking cracked residue of the organic peroxide, so that the water-treeing resistance can be kept for a long term.

Further, with regard to the insulating sheath layer 15, if the organic peroxide is added to the polyethylene in a proportion not more than 0.15 part by mass relative to 100 parts by mass of the polyethylene, an amount of the cross-linking cracked residue of the organic peroxide after the graft polymerization becomes not more than 0.15% by weight, that is more preferable. On the other hand, if the organic peroxide is added to the polyethylene in a proportion of less than 0.05 part by mass relative to 100 parts by mass of the polyethylene, the cross-linking is insufficiently achieved, thus, it is preferable that the additive amount is not more than 0.05 part by mass.

It is preferable that the insulating sheath layer 15 includes an antioxidant including an aromatic ring, and the antioxidant is added in a proportion of not less than 0.1 part by mass relative to 100 parts by mass of the polyethylene. By this, of course, a heat aging resistance of the insulating sheath layer 15 can be enhanced, and due to the addition of the antioxidant including the aromatic ring, energy of radiation including gamma beam is absorbed by a pi ($\pi$)-conjugated system, so that a radiation deterioration resistance of the insulating sheath layer 15 can be also enhanced. Namely, if the antioxidant is added in an amount of not less than a predetermined rate, deterioration due to the radiation can be prevented. On the other hand, if the insulating sheath layer 15 includes an antioxidant including an aromatic ring, the antioxidant being added into the insulating sheath layer 15 in a proportion of more than 0.5 part by mass relative to 100 parts by mass of the polyethylene, a bloom phenomenon (the antioxidant deposits on the surface of the polyethylene) occurs, so that it is preferable that the additive amount is not more than 0.5 part by mass.

The enamel of the enamel coating 13 includes, for example, epoxy enamel, polyimide series enamel, polyamide-imide series enamel, polyester imide series enamel.

The polyethylene of the insulating sheath layer 15 includes, for example, polymeric materials which contain polyethylene polymerized by an ion polymerization method, polyethylene polymerized by a radical polymerization method or polyethylene mixture of the ion polymerization polyethylene and the radical polymerization polyethylene as a main constituent.

In addition to the above-mentioned polyethylene, one or more than two of ethylene copolymer such as ethylene ethyl acrylate copolymer, ethylene vinyl acetate copolymer, ethylene methacrylate copolymer, ethylene propylene copolymer, and polyolefin grafted by functional groups containing maleic acid anhydride, epoxy or the like can be also included.

The unsaturated silane compound contained in the polyethylene of the insulating sheath layer 15 includes organic silane having vinyl group such as vinyl trimethoxysilane, triethoxysilane, and the organic peroxide used for grafting the silane compound onto the polyolefin includes only one or combination of more than two of dicumyl peroxide, 2,5- dimethyl-2,5-di(t-butylperoxy)hexine-3,2,5-dimethyl-2,5-di (t-butylperoxy)hexane, α,α'-bis(t-butylperoxy-m-isopropyl) benzene.

The siloxane condensation catalyst includes dibutyltin dilaurate, dioctyltin dilaurate, zinc adipate, calcium adipate, zinc octanoate.

The antioxidant including an aromatic ring includes one or more than two selected from 2,2-thio-diethylenebis[3-(3,5-di-t-butyl-4-hydroxyphenyl)propionate], pentaerythrityl-tetrakis[3-(3,5-di-t-butyl-4-hydroxyphenyl)propionate], octadecyl 3-(3,5-di-t-butyl-4-hydroxyphenyl)propionate, 2,4-bis-(n-octylthio)-6-(4-hydroxy-3,5-di-t-butylanilino)-1,3,5-triazine, bis[2-methyl-4-[3-n-alkyl(C12 or C14)thiopropionyloxy]-5-t-butylphenyl]sulfide, and 4,4'-thiobis (3-methyl-6-t-butylphenol).

Second Embodiment

A submersible motor electric wire in the second embodiment according to the invention will be explained below referring to the drawings.

Figure 2:
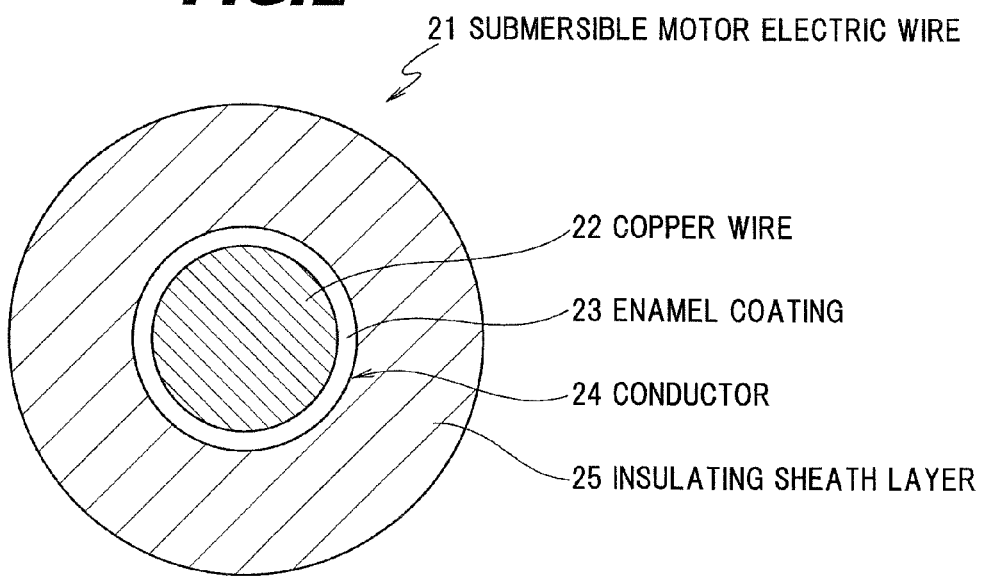
FIG. 2 is a transverse cross-sectional view schematically showing a submersible motor electric wire in a second embodiment according to the invention.

As shown in FIG. 2, a submersible motor electric wire 21, comprises a conductor 24 comprising a copper wire 22 and an enamel coating 23 formed on the periphery of the copper wire 22 and an insulating sheath layer 25 formed on the periphery of the conductor 24, wherein the insulating sheath layer 25 comprises a composition including polyethylene as a main constituent, and the composition is cross-linked by being irradiated with an ionizing radiation.

Thus, the cross-linking can be sufficiently achieved without adding organic peroxide. Therefore, deterioration in the water-treeing resistance can be prevented which may be caused by the cross-linking cracked residue of the organic peroxide, so that the water-treeing resistance can be kept for a long term.

It is preferable that the insulating sheath layer 25 includes an antioxidant including an aromatic ring, the antioxidant being added into the insulating sheath layer 25 in an amount of not less than 0.1 part by mass relative to 100 parts by mass of the polyethylene. By this, of course, a heat aging resistance of the insulating sheath layer 25 can be enhanced, and due to the addition of the antioxidant including the aromatic ring, energy of radiation including gamma beam is absorbed by a pi (π)-conjugated system, so that a radiation deterioration resistance of the insulating sheath layer 25 can be also enhanced. Namely, if the antioxidant is added in an amount of not less than a predetermined rate, deterioration due to the radiation can be prevented.

In order to accelerate the cross-linking, for example, triallyl isocyanurate, triallyl cyanurate, trimethylolpropane trimethacrylate, trimethylolpropane triacrylate can be added to the composition including polyethylene as a main constituent.

The enamel of the enamel coating 23 includes, for example, epoxy enamel, polyimide series enamel, polyamide-imide series enamel, polyester imide series enamel.

The polyethylene of the insulating sheath layer 25 includes, for example, polymeric materials which contain polyethylene polymerized by an ion polymerization method, polyethylene polymerized by a radical polymerization method or polyethylene mixture of the ion polymerization polyethylene and the radical polymerization polyethylene as a main constituent.

In addition to the above-mentioned polyethylene, one or more than two of ethylene copolymer such as ethylene ethyl acrylate copolymer, ethylene vinyl acetate copolymer, ethylene methacrylate copolymer, ethylene propylene copolymer, and polyolefin grafted by functional groups containing maleic acid anhydride, epoxy or the like can be also included.

The antioxidant including an aromatic ring includes one or more than two selected from 2,2-thio-diethylenebis[3-(3,5-di-t-butyl-4-hydroxyphenyl)propionate], pentaerythrityl-tetrakis[3-(3,5-di-t-butyl-4-hydroxyphenyl)propionate], octadecyl 3-(3,5-di-t-butyl-4-hydroxyphenyl)propionate, 2,4-bis-(n-octylthio)-6-(4-hydroxy-3,5-di-t-butylanilino)-1,3,5-triazine, bis[2-methyl-4-[3-n-alkyl(C12 or C14) thiopropionyloxy]-5-t-butylphenyl]sulfide, and 4,4'-thiobis (3-methyl-6-t-butylphenol).

EXAMPLES

As shown in FIG. 3, conventional submersible motor electric wires 31 in Comparative Examples 1, 2 comprise a conductor 34 comprising a copper wire 32 and an enamel coating 33 formed on the periphery of the copper wire 32 and an insulating sheath layer 35 formed on the periphery of the conductor 34.

The submersible motor electric wires according to Examples 1 to 9 are the submersible motor electric wire 11 and the submersible motor electric wires according to Examples 10 to 11 are the submersible motor electric wire 21.

An epoxy resin coating with a structural formula (E) below was repeatedly coated on peripheries of the copper wires 12, 22, 32 having a diameter of almost 4.5 mm and the epoxy resin coating was burned into the peripheries, so that the enamel coatings 13, 23, 33 having a thickness of almost 0.6 mm were formed.

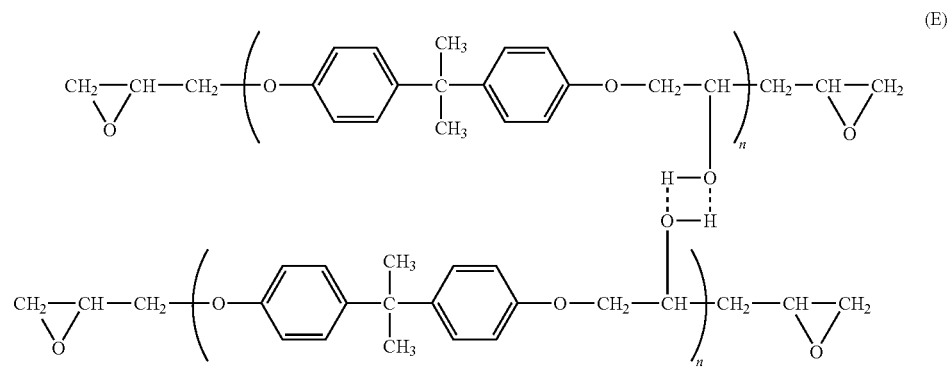

(E)

A composition composed of components (the unit thereof is "part by mass") shown in Table 1 was extruded and coated on the peripheries of the conductors 14, 24, 34, so that the insulating sheath layers 15, 25, 35 having a thickness of 5 mm were formed.

Number of cracks was evaluated based on that after each of samples was immersed into water of 70 degrees C. in temperature for 40000 hours, the insulating sheath layer of the winding wire was separated and an enamel coating at the bending portion was examined through a magnifying glass.

TABLE 1

| Component | Example | | | | | | | | | | | Comparative example | |
|---|---|---|---|---|---|---|---|---|---|---|---|---|---|
| | 1 | 2 | 3 | 4 | 5 | 6 | 7 | 8 | 9 | 10 | 11 | 1 | 2 |
| Ion polymerization polyethylene (d = 0.922, MI = 2.3 g/10 min) | 100 | 100 | 100 | 100 | 100 | 100 | 100 | 100 | 100 | 100 | 100 | 100 | — |
| Radical polymerization polyethylene (d = 0.920, MI = 1.0 g/10 min) | — | — | — | — | — | — | — | — | — | — | — | — | 100 |
| Vinyl trimethoxysilane | 2.0 | 1.5 | 1.0 | 1.0 | 1.0 | 1.0 | 1.0 | 1.0 | 1.0 | — | — | — | — |
| Dicumyl peroxide | 0.2 | 0.15 | 0.1 | 0.1 | 0.1 | 0.1 | 0.1 | 0.1 | 0.1 | — | — | 2.0 | 2.0 |
| Dibutyltin dilaurate | 0.05 | 0.05 | 0.05 | 0.05 | 0.05 | 0.05 | 0.05 | 0.05 | 0.05 | — | — | — | — |
| Pentaerythrityl-tetrakis [3-(3, 5-di-t-butyl-4-hydroxyphenyl) propionate] | 0.1 | 0.2 | 0.2 | — | — | — | — | — | — | 0.2 | — | — | — |
| 4,4'-thiobis (3-methyl-6-t-butylphenol | — | — | — | 0.15 | 0.1 | 0.08 | 0.05 | — | — | — | — | 0.2 | 0.2 |
| Dilaurylthio propionate | — | — | — | — | — | — | — | 0.1 | — | — | 0.1 | — | — |
| Ditridecylthio propionate | — | — | — | — | — | — | — | — | 0.1 | — | — | — | — |
| Evaluation Number of cracks | 0.6 | 0 | 0 | 0 | 0 | 0 | 0 | 0 | 0 | 0 | 0 | 3.75 | 3.5 |
| Extrusion moldability | Δ | ○ | ○ | ○ | ○ | ○ | ○ | ○ | ○ | ○ | ○ | ○ | ○ |
| Bow-tie treeing property | ○ | ○ | ○ | ○ | ○ | ○ | ○ | ○ | ○ | ○ | ○ | X | X |
| Bow-tie treeing property after gamma-irradiation | ○ | ○ | ○ | ○ | ○ | Δ | Δ | X | X | ○ | X | X | X |

In Examples 1 to 9, polyethylene was fed into a 130 mm extruder of 200 degree C. in temperature, and all of the other components were dissolved with vinyl trimethoxysilane and then were poured into the extruder through the lower portion of the hopper of the extruder (however, the components poorly-soluble in the vinyl trimethoxysilane were preliminarily dry-blended with the polyethylene and fed into the extruder), all the components were mixed in the extruder, and a material for the insulating sheath layer grafted by silane was extruded and contacted with water continuously so as to be cross-linked, so that the submersible motor electric wire 11 was completed.

In Examples 10 to 11, the material for the insulating sheath layer was extruded and an ionizing radiation is applied thereto continuously so as to be cross-linked, and the insulating sheath layer 25 was formed, so that the submersible motor electric wire 21 was completed.

In Comparative Examples 1 to 2, an organic peroxide was added in an amount of being required at the chemistry cross-linking, the material for the insulating sheath layer was extruded and heated by high pressure steam continuously so as to be chemically cross-linked, and the insulating sheath layer 35 was formed, so that the submersible motor electric wire 31 was completed.

Each of the submersible motor electric wires of Examples 1 to 11 and Comparative Examples 1 to 2 was formed so as to have a bending radius at the formation of the winding wire (R=almost 30 mm), so that the respective twenty samples were obtained.

Evaluation items in the evaluation column of Table 1 collectively show results of property tests to the samples of the respective submersible motor electric wires.

Since the crazing grows to the crack over a long time, an average value of the number of the cracks observed in each of the samples was evaluated.

Extrusion moldability was evaluated based on that the surface of the insulating sheath layer was visually observed and if the surface has a very good condition (the surface is flat and smooth) it is shown by a mark of (○) in Table 1, and if no good (the surface has concavity and convexity), shown by a mark of (x).

Bow-tie treeing property was evaluated based on that each of samples was immersed into hot water of 90 degrees C. in temperature and alternating current of 50 Hz and 3 kV was applied to the interface between the conductor and the water for 500 days. After 500 days, the cross-section surface of the insulating sheath layer was finely sliced and dyed in a boiling condition by using an aqueous solution of methylene blue, the length of the bow-tie treeing was measured by using an optical microscope, and the number of occurrences of the bow-tie treeing having the length of not less than 200 μm was counted.

If the number of occurrences is not less than $1.0\times10^3$ (number/$m^3$) the evaluation is determined as no good and the mark of (x) is filled in Table 1, if the number of occurrences is more than $1.0\times10^2$ (number/$m^3$) and less than $1.0\times10^3$ the evaluation is determined as good and the mark of (Δ) is filled in Table 1, and if the number of occurrences is not more than $1.0\times10^2$ (number/$m^3$) the evaluation is determined as very good and the mark of (○) is filled in Table 1.

Resistance to radiation deterioration was evaluated based on that after gamma beam (amount of radiation exposure of 1.0 MGy) was irradiated to each of the samples, the above-mentioned bow-tie treeing property test was carried out and similarly evaluated.

As shown in the evaluation column of Table 1, in the submersible motor electric wire 11 of Examples 1 to 11 to which the organic peroxide is added in a small amount, the number of the cracks which occurs in the enamel coating in case of assuming long-term usage is smaller in comparison with the submersible motor electric wire 31 of Comparative Examples 1 to 2, and further, in the submersible motor electric wire 11 of Examples 2 to 9 to which the organic peroxide is added in an amount of not more than 0.15 part by mass, no crack occurs in the enamel coating even if the long-term usage is assumed.

Further, in the submersible motor electric wires 11, 21 of Examples 1 to 7, 10 to which the antioxidant including an aromatic ring is added, the number of the bow-tie treeing after the gamma beam radiation is smaller in comparison with the submersible motor electric wire 11 of Examples 8, 9, and furthermore, in the submersible motor electric wires 11, 21 of Examples 1 to 5, 10 to which the antioxidant including an aromatic ring is added in an amount of not less than 0.1 part by mass, the number of the bow-tie treeing after the gamma beam radiation is further smaller.

From the above description, it has been clarified that a submersible motor electric wire can be obtained, which has a good water-treeing property to be kept for lengthy periods of time and a good resistance to radiation deterioration, by applying the insulating sheath layers 15, 25 of the invention to the submersible motor electric wire.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A submersible motor electric wire, comprising:
    a conductor comprising a copper wire and an enamel coating formed on the periphery of the copper wire; and
    an insulating sheath layer formed outside the enamel coating,
wherein the insulating sheath layer comprises a silane graft polymer as a main constituent, and the silane graft polymer is formed by a graft-polymerization that an unsaturated silane compound and dicumyl peroxide are added to polyethylene, dicumyl peroxide being added in a proportion of not more than 0.15 parts by mass to 100 parts by mass of the polyethylene, and is cross-linked contacting with water in the presence of a siloxane condensation catalyst, the enamel coating selected from the group consisting of epoxy enamel, polyimide series enamel, polyamide-imide series enamel and polyester imide series enamel, wherein the insulating sheath layer comprises water, wherein the number of occurrences of bow-tie treeing having a length of more than 200 μm at a cross section of the insulating sheath layer is less than $1.0*10^2$ (number/m$^3$), wherein the submersible motor electric wire is immersed into hot water of 90 degrees Celsius and alternating current of 50 Hz and 3 kV is applied to an interface between the conductor and the hot water for 500 days.

2. The submersible motor electric wire according to claim 1, wherein the insulating sheath layer further comprises an antioxidant including an aromatic ring for preventing the insulating sheath layer from being deteriorated due to radiation, and the antioxidant is added in a proportion of not less than 0.1 part by mass to 100 parts by mass of the polyethylene.

3. The submersible motor electric wire according to claim 2, wherein the antioxidant comprises one or more than two selected from the group consisting of 2,2-thio-diethylenebis[3-(3,5-di-t-butyl-4-hydroxyphenyl)propionate, pentaerythrityl-tetrakis[3-(3,5-di-t-butyl-4-hydroxyphenyl)propionate, octadecyl 3-(3,5-di-t-butyl-4-hydroxyphenyl)propionate, 2,4-bis-(n-octylthio)-6-(4-hydroxy-3,5-di-t-butylanilino)-1,3,5-triazine, bis[2-methyl-4-[3-n-alkyl(C12 or C14)thiopionyloxy]-5-t-butylphenyl]sulfide, and 4,4'-thiobis(3-methyl-6-t-butylphenol).

4. The submersible motor electric wire according to claim 1, wherein the enamel coating is a coating for preventing deposition and diffusion of copper ions from the copper wire.

5. The submersible motor electric wire according to claim 1, wherein the insulating sheath layer is formed on the periphery of the enamel coating.

6. The submersible motor electric wire according to claim 1, wherein the dicumyl peroxide is added in a proportion of not less than 0.05 parts by mass to 100 parts by mass of the polyethylene.

7. A submersible motor electric wire, comprising:
    a conductor comprising a copper wire and an enamel coating formed on the periphery of the copper wire; and
    an insulating sheath layer formed outside the enamel coating, wherein the insulating sheath layer comprises a composition including polyethylene as a main constituent and an antioxidant including an aromatic ring to prevent the insulating sheath layer from deterioration due to radiation, and the composition is cross-linked by being irradiated with an ionizing radiation, the enamel coating selected from the group consisting of epoxy enamel, polyimide series enamel, polyamide-imide series enamel and polyester imide series enamel, wherein the number of occurrences of bow-tie treeing having a length of more than 200 μm at a cross section of the insulating sheath layer is less than $1.0*10^2$ (number/m$^3$), wherein the submersible motor electric wire is immersed into hot water of 90 degrees Celsius and alternating current of 50 Hz and 3 kV is applied to an interface between the conductor and the hot water for 500 days.

8. The submersible motor electric wire according to claim 7, wherein the antioxidant is added in a proportion of not less than 0.1 part by mass to 100 parts by mass of the polyethylene.

9. The submersible motor electric wire according to claim 7, wherein the enamel coating is a coating for preventing deposition and diffusion of copper ions from the copper wire.

10. The submersible motor electric wire according to claim 7, wherein the insulating sheath layer is formed on the periphery of the enamel coating.

11. The submersible motor electric wire according to claim 7, wherein the antioxidant comprises one or more than two selected from the group consisting of 2,2-thio-diethylenebis[3-(3,5-di-t-butyl-4-hydroxyphenyl)propionate, pentaerythrityl-tetrakis[3-(3,5-di-t-butyl-4-hydroxyphenyl)propionate, octadecyl 3-(3,5-di-t-butyl-4-hydroxyphenyl)propionate, 2,4-bis-(n-octylthio)-6-(4-hydroxy-3,5-di-t-butylanilino)-1,3,5-triazine, bis[2-methyl-4-[3-n-alkyl (C12 or C14)thiopionyloxy]-5-t-butylphenyl]sulfide, and 4,4'-thiobis(3-methyl-6-t-butylphenol).

12. A submersible motor electric wire, comprising:
    a conductor comprising a copper wire and an enamel coating formed on the periphery of the copper wire; and
    an insulating sheath layer formed outside the enamel coating,
wherein the insulating sheath layer comprises a silane graft polymer as a main constituent, and the silane graft polymer is formed by a graft-polymerization that an unsaturated silane compound and dicumyl peroxide are added to polyethylene, dicumyl peroxide being added in a proportion of not more than 0.15 parts by mass to 100 parts by mass of the polyethylene, and is cross-linked contacting with water in the presence of a siloxane condensation catalyst, the enamel coating selected from the group consisting of epoxy enamel, polyimide series enamel, polyamide-imide series enamel and polyester imide series enamel, wherein the insulating sheath layer comprises water, wherein the number of occurrences of bow-tie treeing having a length of more than 200 μm at a cross section of the insulating sheath layer is less than $1.0*10^3$ (number/m$^3$), wherein after gamma beam with an amount of radiation exposure of 1.0 MGy is irradiated to the submersible motor electric wire, the submersible motor electric wire is immersed into hot water of 90 degrees Celsius and alternating current of 50 Hz and 3 kV is applied to an interface between the conductor and the hot water for 500 days.

13. The submersible motor electric wire according to claim 12, wherein the insulating sheath layer further comprises an antioxidant including an aromatic ring for preventing the insulating sheath layer from being deteriorated due to radiation, and the antioxidant is added in a proportion of not less than 0.1 part by mass to 100 parts by mass of the polyethylene.

14. The submersible motor electric wire according to claim 13, wherein the antioxidant comprises one or more than two selected from the group consisting of 2,2-thio-diethylenebis[3-(3,5-di-t-butyl-4-hydroxyphenyl)propionate, pentaerythrityl-tetrakis[3-(3,5-di-t-butyl-4-hydroxyphenyl)propionate, octadecyl 3-(3,5-di-t-butyl-4-hydroxyphenyl)propionate, 2,4-bis-(n-octylthio)-6-(4-hydroxy-3,5-di-t-butylanilino)-1,3,5-triazine, bis[2-methyl-4-[3-n-alkyl(C12 or C14)thiopropionyloxy]-5-t-butylphenyl]sulfide, and 4,4'-thiobis(3-methyl-6-t-butylphenol).

15. The submersible motor electric wire according to claim 12, wherein the enamel coating is a coating for preventing deposition and diffusion of copper ions from the copper wire.

16. The submersible motor electric wire according to claim 12, wherein the insulating sheath layer is formed on the periphery of the enamel coating.

17. The submersible motor electric wire according to claim 12, wherein the dicumyl peroxide is added in a proportion of not less than 0.05 parts by mass to 100 parts by mass of the polyethylene.

18. A submersible motor electric wire, comprising:
a conductor comprising a copper wire and an enamel coating formed on the periphery of the copper wire; and
an insulating sheath layer formed outside the enamel coating, wherein the insulating sheath layer comprises a composition including polyethylene as a main constituent and an antioxidant including an aromatic ring to prevent the insulating sheath layer from deterioration due to radiation, and the composition is cross-linked by being irradiated with an ionizing radiation, the enamel coating selected from the group consisting of epoxy enamel, polyimide series enamel, polyamide-imide series enamel and polyester imide series enamel, wherein the number of occurrences of bow-tie treeing having a length of more than 200 μm at a cross section of the insulating sheath layer is less than $1.0*10^3$(number/m$^3$), wherein after gamma beam with an amount of radiation exposure of 1.0 MGy is irradiated to the submersible motor electric wire, the submersible motor electric wire is immersed into hot water of 90 degrees Celsius and alternating current of 50 Hz and 3 kV is applied to an interface between the conductor and the hot water for 500 days.

19. The submersible motor electric wire according to claim 18, wherein the antioxidant is added in a proportion of not less than 0.1 part by mass to 100 parts by mass of the polyethylene.

20. The submersible motor electric wire according to claim 18, wherein the enamel coating is a coating for preventing deposition and diffusion of copper ions from the copper wire.

21. The submersible motor electric wire according to claim 18, wherein the insulating sheath layer is formed on the periphery of the enamel coating.

22. The submersible motor electric wire according to claim 18, wherein the antioxidant comprises one or more than two selected from the group consisting of 2,2-thio-diethylenebis[3-(3,5-di-t-butyl-4-hydroxyphenyl)propionate, pentaerythrityl-tetrakis[3-(3,5-di-t-butyl-4-hydroxyphenyl)propionate, octadecyl 3-(3,5-di-t-butyl-4-hydroxyphenyl)propionate, 2,4-bis-(n-octylthio)-6-(4-hydroxy-3,5-di-t-butylanilino)-1,3,5-triazine, bis[2-methyl-4-[3-n-alkyl (C12 or C14)thiopropionyloxy]-5-t-butylphenyl]sulfide, and 4,4'-thiobis(3-methyl-6-t-butylphenol).

\* \* \* \* \*